Aug. 18, 1942.   J. T. HEPBURN   2,293,391
DRIVING CONTROL UNIT FOR LATHES AND THE LIKE
Filed July 18, 1941   2 Sheets-Sheet 1
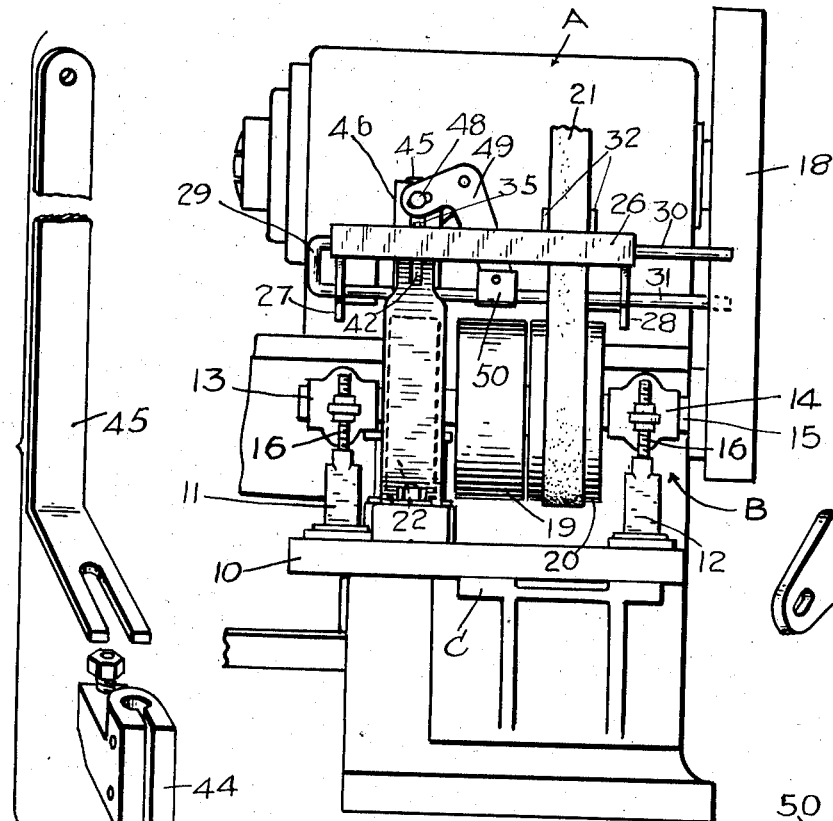
FIG.1.
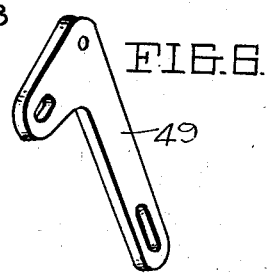
FIG.6.
FIG.5.
FIG.7.
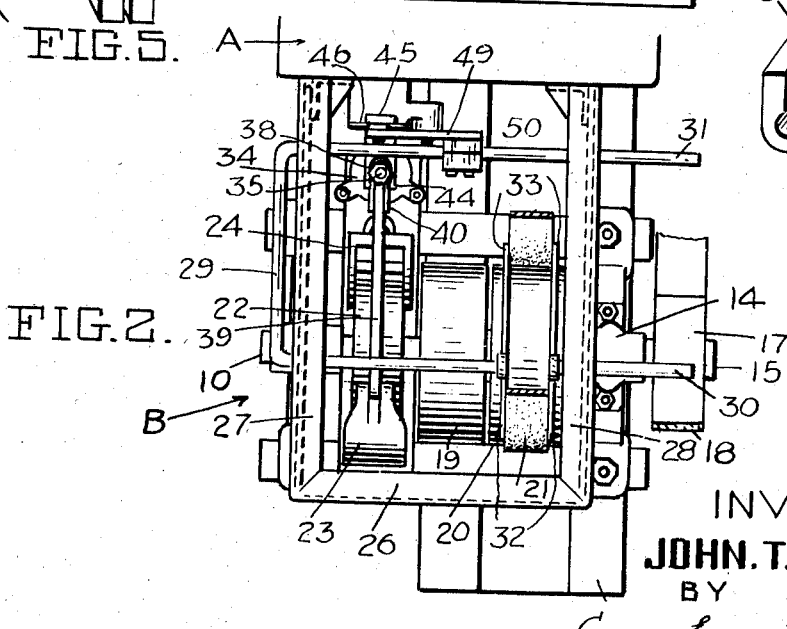
FIG.2.
INVENTOR
JOHN. T. HEPBURN
BY
Eugene E. Stevens
ATTORNEY.

Aug. 18, 1942.   J. T. HEPBURN   2,293,391
DRIVING CONTROL UNIT FOR LATHES AND THE LIKE
Filed July 18, 1941   2 Sheets-Sheet 2

INVENTOR
JOHN T. HEPBURN.
BY Eugene E. Stevens
ATTORNEY.

Patented Aug. 18, 1942

2,293,391

UNITED STATES PATENT OFFICE 2,293,391

DRIVING CONTROL UNIT FOR LATHES AND THE LIKE

John T. Hepburn, Toronto, Ontario, Canada

Application July 18, 1941, Serial No. 403,060

3 Claims. (Cl. 192—10)

This invention relates to driving control units for lathes and the like.

In a great majority of cases industrial machinery at the present time is driven by electric motors and it is usual to have an electric motor mounted on machine units to drive them. However, in cases where the electric power fails, or where, for instance, such as in time of war, electric power insulations have been destroyed, considerable difficulty is experienced since whole plants may be stopped through lack of power for operating the machinery and may be stopped for a considerable period of time while arrangements are made to readjust the machinery so that it can be brought into operation again.

It is an object of the present invention to provide a driving control unit which may be bodily mounted upon industrial machinery in place of the motor so that the machinery may be quickly readjusted to be driven by other power means such as a Diesel motor.

A further object of the invention is to provide a complete unit of the character referred to incorporating a driving and idler element with a means for readily shifting the transmission from the power source from one to the other.

A still further object of the invention is to provide a unit of the character referred to which may be operated easily by push button control.

With these and other objects in view the invention generally comprises a unit carrying a drive shaft including an idler element, a driving element and a brake with a common control means for driving and stopping the shaft including simple means for transferring the transmission from the power source from the driving element to the idler element and vice versa as required. The invention will be fully understood by reference to the following detailed specification taken in conjunction with the accompanying drawings wherein a pulley driven mechanism is described to illustrate the invention.

In the drawings:

Fig. 1 is a front elevation of the driving control unit mounted on a lathe, a part of the latter being shown.

Fig. 2 is a top plan view of the driving control unit.

Fig. 5 is an enlarged sectional detail of the control link and bracket operating in conjunction with the control cylinder for actuating the belt shifting mechanism.

Fig. 6 is an enlarged perspective detail of the bell crank lever associated with the control link for actuating the belt shifting mechanism.

Fig. 7 is an enlarged perspective detail of the connecting bracket establishing connection between the bell crank lever and bell shifting carriage.

Figure 3:
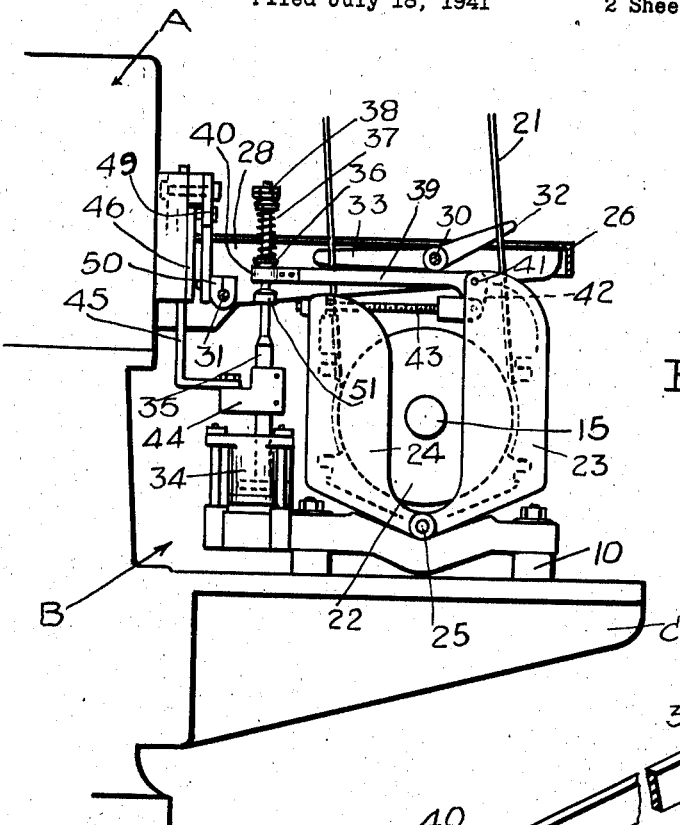
Fig. 3 is a side elevation of the driving control unit.
Figure 8:
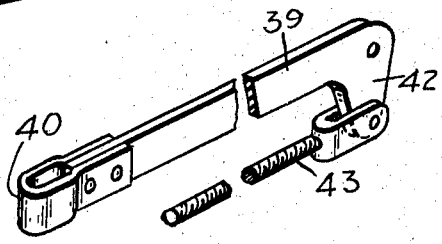
Fig. 8 is an enlarged perspective detail of the control lever for actuating the brake shoes to and from the engaged position with the brake pulley.

Referring to the drawings, A indicates a lathe or other piece of machinery which is driven by a driving unit and B indicates a driving control unit according to the present invention for operating such machinery. The driving control unit according to the present invention preferably includes a base 10 having pedestals 11 and 12 supporting suitable shaft bearings 13 and 14 in which is journalled the driving shaft 15. The pedestals may be adjustable by means of screw threaded standards 16 to provide for vertical adjustment of unit parts. The drive shaft 15 in the present illustration is designed to carry a driven pulley 17 which by means of a belt 18 drives the machine with which the driving control unit is associated. Alternatively, of course, the unit might employ other suitable types of driving connection with the machine to be operated.

On the drive shaft 15 is mounted a driving pulley 19 and an idler pulley 20 associated with which is a driving belt 21 connected with a suitable source of drive and adapted to be shifted from the idler pulley 20 to the driving pulley 19 and vice versa.

Also mounted on the drive shaft 15 is a brake pulley 22 associated with which are the brake shoes 23 and 24 (see Fig. 3) commonly pivoted at 25 below the pulley and suitably supported on the base. These shoes are designed to be swung into engagement and out of engagement with the brake pulley 22 so as to control the operation of the drive shaft 15. The driving control unit may readily be supported on a suitable supporting bracket C which normally may form a part of the machine to support a motor so that the driving control unit B as a whole may be readily mounted on the machine to replace a motor, if necessary, and in a comparatively short period of time. The unit also includes an upper supporting framework 26 laterally projecting from an upper part of the machine A, the framework including the side arms 27 and 28.

Slidably mounted in the side arms 27 and 28 of the upper supporting frame 26 is a belt shifting carriage 29 which may take the form of a U-shaped member having the parallel spaced apart arms 30 and 31, the arm 30 carrying pairs of belt shifting arms 32 and 33 respectively which are designed to straddle the driving belt 21, as clearly shown in Fig. 2. The belt shifting carriage is designed to be reciprocated transversely so as to move the driving belt 21 from the idler pulley 20 to the driving pulley 19 and vice versa.

In the normal position, the driving belt 21 is on the idler pulley 20, as shown in Fig. 1, and in this position the brake shoes 23 are forced to grip the brake pulley 22 to retain the drive shaft 15 from rotation. They are released from engagement from the brake pulley when it is desired to operate the machine, A, and the belt 21 is shifted to the drive pulley 19 simultaneously, by means of a single control which may take the form of a pneumatic cylinder 34 (see Figs. 4 and 5) having its piston rod 35 projecting vertically upwardly from it and reciprocated vertically upon operation one way or the other. In the case of the brake shoes the piston rod 35 carries a pressure member 36, spring pressed by the coil springs 37 the pressure of which may be adjusted by a suitable nut and locknut 38, the pressure being adjusted such that when the piston is in its lower position the pressure member 36 will exert sufficient pressure upon the control lever 39 to apply the brake. The control lever 39 has a fitting 40 which encircles the piston rod 35 and against which the pressure member 36 may abut.

At the opposite end the lever 39 is pivoted as at 41 at the top of brake shoe 23 and has a short arm 42 at right angles to the main body of the lever which is pivotally connected to a suitable link 43 in turn connected with the upper end of the brake shoe 24. The link 43 may be screw threaded as shown for the purpose of adjusting the braking pressure. It will be seen, therefore, that when a downward pressure is exerted on lever 39 its tendency is to swing on its pivot 41 and draw upon link 43 so as to pull both brake shoes 23 and 24 towards one another and into engagement with the brake pulley 22. Thus, in the normal position the brake is maintained.

Figure 4:
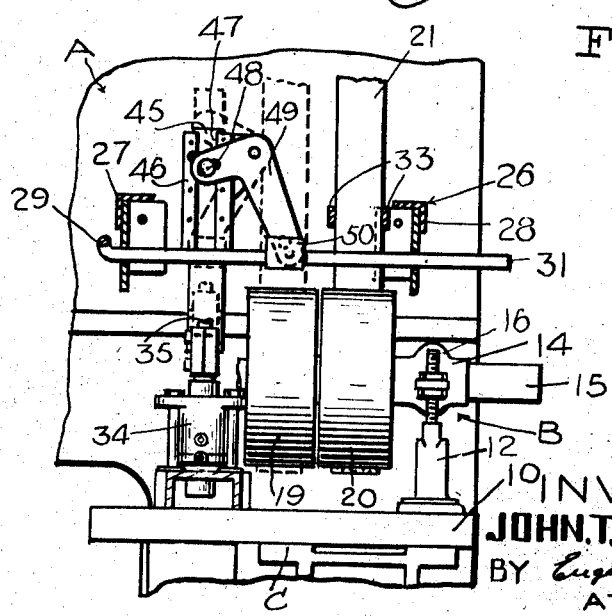
Fig. 4 is a detail front elevation of the driving control unit, part of the mechanism in section and the brake pulley and shoes removed to illustrate the position of the pneumatic controlled cylinder.

The piston rod 35 has a suitable bracket 44 mounted on it designed to connect with an L-shaped or angle control link 45 which, when the piston rod moves vertically, upwardly or downwardly, slides in a suitable guideway 46 (see Figs. 3 and 4). This guideway has an open slot 47 through which a pin 48 on the link 45 may project and into engagement with one arm of a bell crank lever 49 which may be pivoted from a suitable support projecting from the guideway structure 46. The opposite arm of the bell crank lever 49 is pivotally connected to a suitable bracket 50 mounted on the arm 31 of the belt shifting carriage so that upon vertical reciprocation of the control link 45 the belt shifting carriage 29 will be caused to reciprocate transversely by means of bell crank lever 49.

Upon operation of the pneumatic cylinder 34 to cause the piston 35 to move vertically upward the control link 45 moving in the same direction will cause the bell crank lever 49 to swing about its pivot so that the bracket 50 and the belt shifting carriage 29 will be moved to the left when viewing Figs. 1 and 4 which will have the effect of transferring drive belt 21 from its normal position on the idler 20 to the drive pulley 19, this shifting being accomplished through the pairs of belt shifting arms 32 and 33. At the same time by means of a member 51 rigidly secured on the piston rod 35 below the arm 39, the latter will be moved upwardly upon the upward movement of the piston rod and such upward movement of lever 39 will by means of its right angular arm 42 cause the connecting link 43 to move to the left when viewed from Fig. 3, thus, releasing the brake shoes 23 and 24 from the brake pulley 22. Consequently the drive shaft is released for rotation simultaneously with the shifting of drive belt 21 from the idler pulley 20 to the driving pulley 19 so that the driven pulley 17 through the belt 18 or any other suitable driving connection employed will cause the machine A to be set in operation. Conversely, the operating parts of the unit are returned to their normal position upon operation of the control cylinder 34 to return the piston rod 35 to its lower position. In this case, of course, the belt is returned to its normal position on the idler pulley 20 and the brake shoes are again drawn together to be applied against the brake pulley 22 by reason of the fact that the coil spring 37 on the piston rod will exert a sufficient pressure against the lever 39 for this purpose when the piston rod is returned to its lower position.

The various parts described will, as is apparent, operate smoothly and in conjunction with one another to effect the several actions required and all parts are actuated through the control cylinder 34 which has been described as a pneumatic cylinder but might, of course, take the form of a hydraulic cylinder, or in fact, if desired be replaced by a manually operated lever if desired.

It will, of course, be understood that while I have illustrated the unit as incorporating an idler pulley and a driven pulley, belt operated, that the unit might be otherwise driven such as by way of a gear drive incorporating an idler and driving gear. The pulleys, therefore, may be considered generally as a driving element and an idler element.

From the foregoing it will be appreciated that I have provided a simple type of unit which may be bodily mounted on machinery to be driven and linked with such machinery in a very simple manner.

What I claim as my invention is:

1. A driving control unit designed to be mounted on lathes and like devices comprising a base, a drive shaft supported from said base and a driving element and an idler element mounted on said drive shaft, means for connecting either one or the other of said elements with a source of power, a support mounted above the base, a laterally shiftable member mounted on said support, said member including an element for engaging the said connecting means, a brake for selectively retaining said shaft against movement, a fluid operated control cylinder and means in connection with said cylinder for actuating and releasing said brake and shifting said laterally shiftable member whereby said connecting means is connected with the driving member upon release of the brake and with the idler member upon actuation of the brake, all said elements, members and other parts aforesaid comprising the unit being mountable between the base and support, said unit being bodily movable for connection with a device to be driven.

2. A driving control unit for lathes and like devices comprising a driving shaft, a driving pulley and an idler pulley mounted on said shaft, said pulleys being designed for belt connection to a source of power, means in said unit for selectively shifting the belt connection with the source of power from the driving element to the idler element and vice versa, a brake designed to control operation of said shaft and means acting simultaneously with the shifting of said belt connection for applying said brake when said driving pulley is disconnected from the source of power and for releasing said brake when the driving pulley is connected with the source of power, said means for selectively shifting the belt including a sliding carriage having spaced apart parallel arms, means on one of said arms for engaging said belt, said other arm being connected with the simultaneously acting means for actuating said brake.

3. A driving control unit for lathes and the like as claimed in claim 2 in which said unit includes a base, means on the base for journalling the driving shaft, a frame above the base, said frame forming a mounting for the carriage, said unit being bodily movable for connection with a given device to be driven.

JOHN T. HEPBURN.